No. 765,061. PATENTED JULY 12, 1904.
A. M. WORD.
PLOW OR CULTIVATOR BLADE.
APPLICATION FILED MAR. 10, 1904.

NO MODEL.

Witnesses
Inventor
A. M. Word
By H. B. Willson
Attorney

No. 765,061.

Patented July 12, 1904.

UNITED STATES PATENT OFFICE.

ARTHUR M. WORD, OF ROME, GEORGIA, ASSIGNOR TO TOWERS AND SULLIVAN MANUFACTURING COMPANY, OF ROME, GEORGIA, A CORPORATION OF GEORGIA.

PLOW OR CULTIVATOR BLADE.

SPECIFICATION forming part of Letters Patent No. 765,061, dated July 12, 1904.

Application filed March 10, 1904. Serial No. 197,529. (No model.)

*To all whom it may concern:*

Be it known that I, ARTHUR M. WORD, a citizen of the United States, residing at Rome, in the county of Floyd and State of Georgia, have invented certain new and useful Improvements in Plow or Cultivator Blades; and I do declare the following to be a full, clear, and exact description of the invention, such as will enable others skilled in the art to which it appertains to make and use the same.

My invention is an improvement in plow and cultivator blades; and it consists in the construction hereinafter described and claimed.

The object of my invention is to effect improvements in the construction of a plow or cultivator blade to lessen the draft thereof and cause it to run more deeply in the soil.

Figure 1:
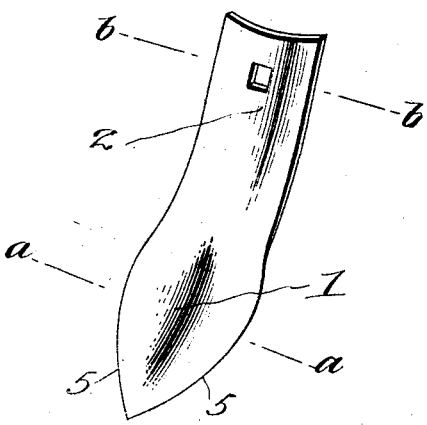
Figures 4, 5:
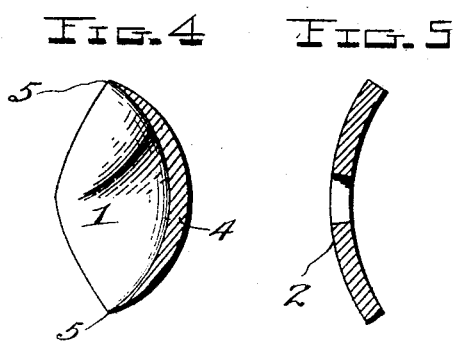
Figure 2:
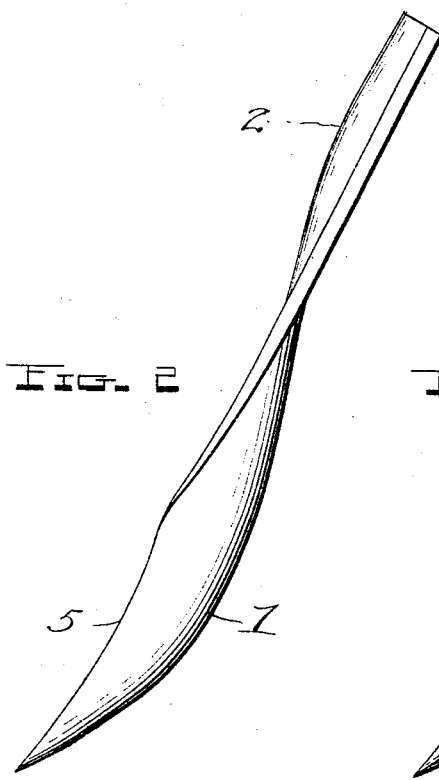
Figure 3:
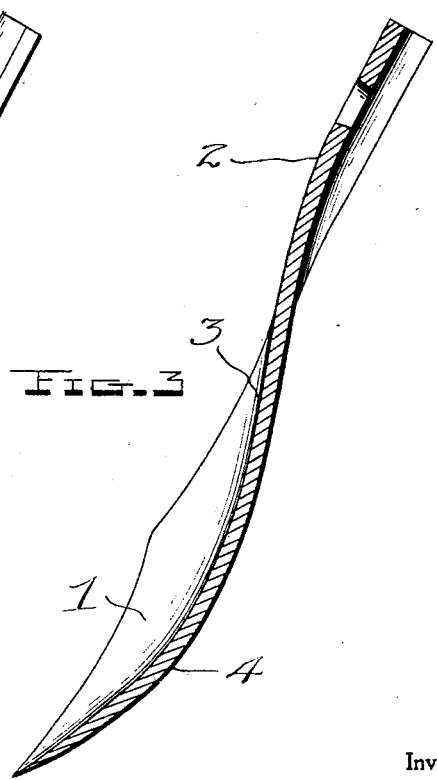

In the accompanying drawings, Figure 1 is a perspective view of a plow or cultivator blade embodying my improvements. Fig. 2 is a side elevation of the same. Fig. 3 is a vertical central sectional view of the same. Fig. 4 is a transverse sectional view of the same, taken on the plane indicated by the line *a a* of Fig. 1. Fig. 5 is a similar view of the same, taken on the plane indicated by the line *b b* of Fig. 1.

In outline the plow or cultivator blade may be of the usual form here shown or of any other suitable form. In accordance with my invention the point or lower end of the blade is concave on its front side, as at 1. The upper portion of the blade is convex on its front side, as at 2. The front side of the blade is concaved or hollowed longitudinally from the lower end or point for about two-thirds the length of the blade, so that the face of the blade on its medial line presents a compound curve, as shown at 3 in Fig. 3. The rear side of the lower portion of the blade is convex, as at 4, and converges laterally and outwardly in opposite directions toward the concave face 1 to provide the lower portion of the blade with the relatively thin cutting edges 5. By thus concaving or hollowing the lower portion of the front side or face of the blade the draft thereof through the soil is materially lessened, as the same presents rearwardly laterally converging surfaces, and the earth displaced thereby is not thrown outwardly therefrom, but is caused to move toward the center thereof and upwardly thereon. The convex upper portion of the blade throws the displaced soil laterally at a point above the surface of the soil.

Having thus described my invention, what I claim as new, and desire to secure by Letters Patent, is—

1. A plow or cultivator blade having its lower portion hollow on its front side and the upper portion thereof laterally convex, and presenting a continuous sinusoidal curve from its point to its upper end.

2. A plow or cultivator blade having its lower portion concave on its front side and convex on its rear side, and its upper portion convex on its front side, substantially as described.

In testimony whereof I have hereunto set my hand in presence of two subscribing witnesses.

ARTHUR M. WORD.

Witnesses:
   A. R. SULLIVAN,
   WADE CALHOON.